Patented Feb. 16, 1926.

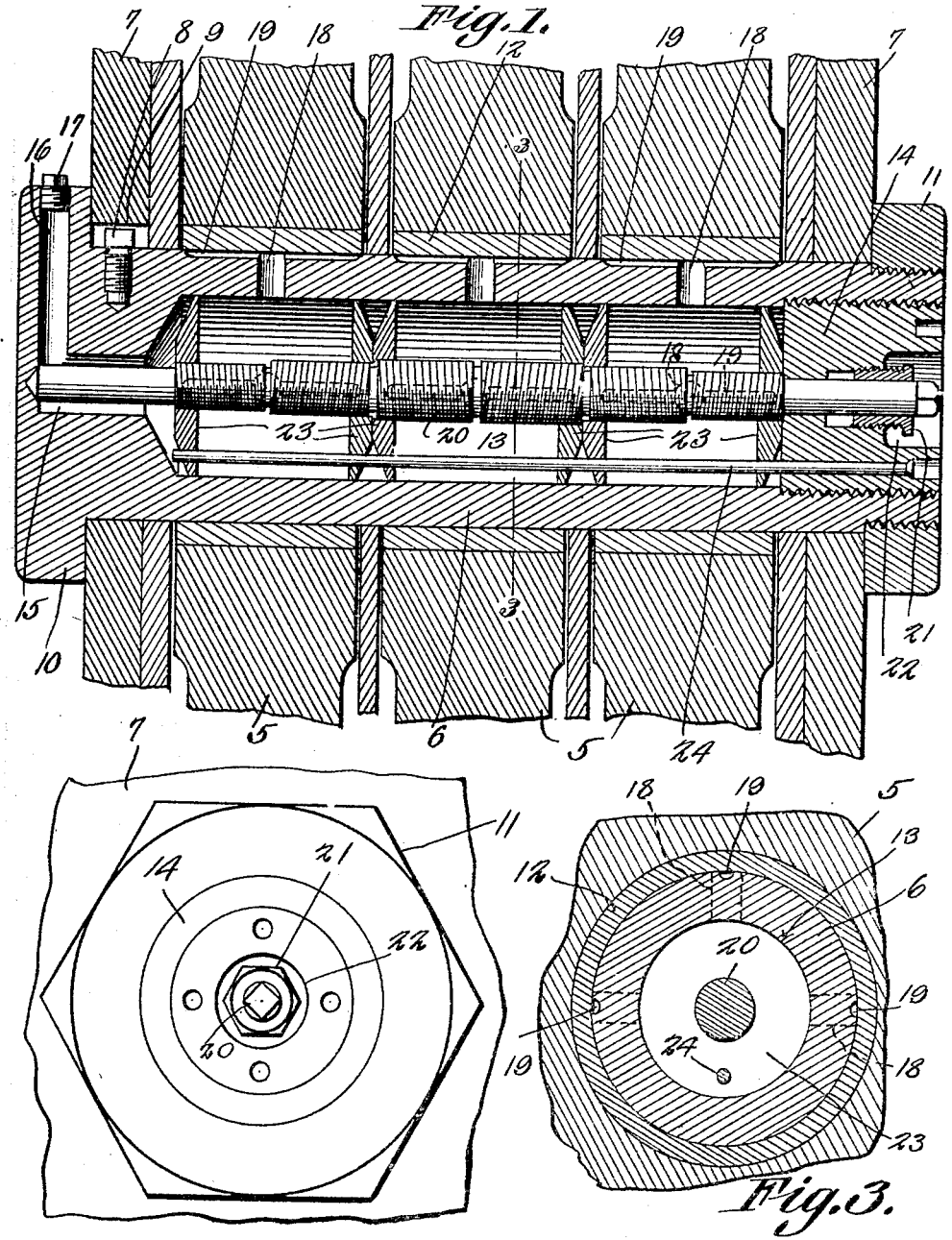

1,573,2○○

UNITED STATES PATENT OFFICE.

LEE J. BLACK, OF BEAUMONT, TEXAS.

LUBRICATING DEVICE.

Application filed November 16, 1922. Serial No. 601,236.

*To all whom it may concern:*

Be it known that I, LEE J. BLACK, a citizen of the United States, residing at Beaumont, in the county of Jefferson and State of Texas, have invented certain new and useful Improvements in Lubricating Devices, of which the following is a specification.

This invention relates broadly to traveling blocks and similar structures in which one or more sheaves or the like are rotatably mounted on a stationary axle, pin, shaft or similar element, but has more specific reference to means for lubricating the bearings of the sheaves.

The invention has for its object to provide a novel and improved means for lubricating the sheaves or the like, and its shaft, and to this end it consists in providing the shaft with an internal lubricant reservoir, and means associated therewith for forcing the lubricant to the desired bearing surfaces, as will be pointed out in the detailed description appearing hereinafter.

In order that the invention may be better understood, reference is had to the accompanying drawing, wherein—

Figure 1 is a central longitudinal section of the invention;

Fig. 2 is an end view, and

Fig. 3 is a cross-section on the line 3—3 of Fig. 1.

The invention is shown applied to a traveling block having three sheaves 5 which are mounted on a stationary axle 6. It is to be understood, however, that the invention is applicable to other structures involving a stationary shaft or the like supporting a rotatable element. A fragment only of the block is shown as this suffices for an understanding of the invention. The frame of the block consists of the usual side plates 7 through which the axle 6 passes. A set screw 8 carried by the axle at one end thereof and having its head seating in a recess 9 in the adjacent side plate, prevents rotation of the axle. The last mentioned end of the axle is formed with a head 10 bearing against the outer face of the side plate 7 at this end, and the outer face of the other side plate is engaged by a nut 11 screwed on the corresponding end of the axle. In the hubs of the sheaves 5 are brass bushings 12.

The shaft 6 has a longitudinal bore 13 forming a lubricant reservoir, and opening through that end of the shaft which carries the nut 11. This end of the reservoir is screw threaded to receive a screw plug 14 which forms a removable closure. The opposite end of the bore has a portion 15 of reduced diameter provided with a lateral extension 16 opening through the side of the head 10 and being here provided with a screw plug or other suitable closure 17. The reservoir is designed to hold a supply of grease, and the end portion 15 and vertical portion 16 constitute an auxiliary lubricant inlet for the purpose of permitting the reservoir to be filled with liquid oil if desired. It is also to be pointed out that the reduced right-angular passage forms an air release when the force feed unit is inserted into the axle. At this time the plug 17 is removed.

In the axle 6 are lubricant delivery ducts 18 which are located in the top and the sides of the axle. These ducts extend radially from the reservoir 13 to the outer surface of the axle so as to carry the lubricant to the bushings 12, and at the site of these ducts the axle has longitudinal external grooves 19 to spread the grease along the bushings. A set of lubricant feed ducts is provided for each sheave 5 as shown in Fig. 1. Also the ducts are arranged at predetermined equidistant points.

Inasmuch as the reservoir 13 is to hold a supply of grease, a means has been provided for positively forcing the same from the reservoir and by the way of the ducts 18 to the bearing surfaces to be lubricated. These means comprise the following elements:

Positioned centrally and longitudinally in the reservoir 13 is a screw-stem 20 having end portions which are smooth and without threads. The inner end portion of the stem extends loosely into the end portion 15 of the reservoir and is journaled in a small depression, and the other stem end portion passes loosely through a hole in the center of the plug 14 from which latter it protrudes so that it may be grasped with a suitable tool and turned. The plug 14 is provided with a stuffing box and packing nut 21 through which the stem passes, and which prevent leakage of grease along the stem. The plug also has its outer face recessed, as shown at 22, and the protruding end of the screw terminates within this recess so that it will not project from the plug.

On the screw-stem 20, inside the reservoir 13, are located disk-like plungers 23 which are centrally threaded to feed along the stem. Inasmuch as three separate series of discharge ducts 18 lead from the reservoir, three pairs of plungers are provided, one pair for each series. The stem 20 is not uniformly threaded. The portion of the screw-stem on which each pair of plungers is mounted, is oppositely threaded, so that when the stem is turned in one direction, the plungers approach each other, and when turned in the other direction, the plungers recede from each other. It will also be noted that the screw-stem is not of uniform diameter throughout its entire length, but is stepped down to different diameters, this being mainly for the purpose of facilitating assembly of the plungers on the screw-stem. In order to prevent rotation of the plungers 23, they are all strung on a stationary rod 24 carried by the plug 14 and extending parallel to the screw-stem 20. The plungers have apertures near their peripheries, through which the rod passes.

To get the grease between the plungers 23, the plug 14 must be removed from the axle 6, and upon so doing the screw-stem 20, the plungers, as well as the rod 24 are also removed, as the stem and the rod are carried by the plug, and the plungers are carried by the stem and the rod. After removal of this unit, the stem thereof will be rotated until the members of the respective pairs of plungers have been spread apart as far as possible, and the grease is then packed therebetween. The parts are now replaced without disturbing the position of the plungers, and the plungers are now located in the reservoir 13 as shown in Fig. 1, the members of the pairs of plungers being located on opposite sides of and equidistant from the discharge ducts 18. If now the stem 20 is turned in the proper direction, the members of the pairs of plungers simultaneously approach each other and thereby cause the grease to be forced through the ducts 18 and into the grooves 19. A slight turn of the screw-stem at suitable intervals suffices to keep the bearing surfaces amply lubricated. When all the grease has been forced out by the plungers, the plug 14, and the parts carried thereby, must be removed for replenishing the supply in the manner hereinbefore described.

The rod 24 positively prevents rotation of the plungers 23, and assures that when the screw-stem 20 is rotated the plungers will travel either towards or from each other according to the direction the screw-stem is turned. The entire assembly of parts can also be readily removed from the axle 6 by merely unscrewing the plug 14, and when the plug is replaced the parts are properly replaced in the reservoir 13. The longitudinally spaced threaded portions of the shaft are designed to let the plungers meet each other exactly opposite the ducts 18 from which the grease is forced. Hence, every bit of the grease is expelled and the abutting of the plungers serves as a signal to indicate the need of replenishing the grease.

Attention is particularly invited to the fact that the rod 24, anchored to the plug 14, not only holds the plungers or pistons 23 against rotation when the screw 20 is rotated to adjust said plungers or pistons, but said rod forces turning of the plungers or pistons with the plug 14, when the latter is rotated incident to inserting the force-feed unit into the shaft or removing it therefrom. By thus providing for rotation of the entire force-feed unit, as it is longitudinally moved, it may be inserted or removed with greater ease than would otherwise be possible, as when inserting any tight-fitting body into a bore, the operation is greatly facilitated if said body be rotated simultaneously with the exertion of endwise force thereon.

I claim:

In a force-feed grease expelling unit for insertion into a hollow shaft, an externally threaded plug adapted to close one end of the shaft, a screw having one end swiveled in and passing through said plug at the axis of the latter, spaced grease-expelling pistons threaded on said screw by right and left hand threads respectively, said pistons having peripheral edges which are concentric with said screw throughout their circumference, and a rod parallel with the screw and anchored at one end to the aforesaid plug, said pistons having openings through which said rod passes to hold the pistons against turning when the screw is turned to operate said pistons and to force rotation of said pistons with said plug when the latter is turned incident to endwise insertion of the unit into the shaft or removal from such shaft, the peripheries of said pistons being exposed for contact with the interior of said shaft.

In testimony whereof I affix my signature.

LEE J. BLACK.